(12) United States Patent
Sugiyo

(10) Patent No.: US 11,876,171 B2
(45) Date of Patent: Jan. 16, 2024

(54) ALL-SOLID-STATE BATTERY AND PRODUCTION METHOD OF THE SAME

(71) Applicant: Hitachi Zosen Corporation, Osaka (JP)

(72) Inventor: Takeshi Sugiyo, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 526 days.

(21) Appl. No.: 16/479,691

(22) PCT Filed: Jan. 23, 2018

(86) PCT No.: PCT/JP2018/001979
§ 371 (c)(1),
(2) Date: Jul. 22, 2019

(87) PCT Pub. No.: WO2018/139448
PCT Pub. Date: Aug. 2, 2018

(65) Prior Publication Data
US 2021/0367265 A1 Nov. 25, 2021

(30) Foreign Application Priority Data

Jan. 24, 2017 (JP) .............................. JP2017-010387

(51) Int. Cl.
*H01M 10/0562* (2010.01)
*H01M 10/0585* (2010.01)
(Continued)

(52) U.S. Cl.
CPC ....... *H01M 10/0562* (2013.01); *H01M 4/043* (2013.01); *H01M 10/0525* (2013.01); *H01M 10/0585* (2013.01); *H01M 2300/0068* (2013.01)

(58) Field of Classification Search
CPC ......... H01M 10/0562; H01M 10/0525; H01M 10/0585; H01M 4/043
See application file for complete search history.

(56) References Cited

U.S. PATENT DOCUMENTS

2010/0209771 A1 8/2010 Shizuka et al.
2011/0045355 A1 2/2011 Ichikawa
(Continued)

FOREIGN PATENT DOCUMENTS

CN 101796672 A 8/2010
CN 101911369 A 12/2010
(Continued)

OTHER PUBLICATIONS

Notice of Reasons for Refusal dated Mar. 2, 2021, issued in corresponding Japanese Patent Application No. 2017-010387 with English translation (15 pgs.).
(Continued)

*Primary Examiner* — Osei K Amponsah
(74) *Attorney, Agent, or Firm* — Pillsbury Winthrop Shaw Pittman, LLP

(57) ABSTRACT

Disclosed is an all-solid-state battery including a positive electrode, a negative electrode, and a solid electrolyte layer interposed between the positive electrode and the negative electrode. At least one of the positive electrode and the negative electrode contains first solid electrolyte particles. The solid electrolyte layer contains second solid electrolyte particles having ion conductivity. An average particle diameter $D1$ of the first solid electrolyte particles, and an average particle diameter $D2$ of the second solid electrolyte particles satisfy $D2>D1$.

18 Claims, 2 Drawing Sheets

(51) Int. Cl.
*H01M 4/04* (2006.01)
*H01M 10/0525* (2010.01)

(56) References Cited

U.S. PATENT DOCUMENTS

| | | | |
|---|---|---|---|
| 2011/0123868 A1 | 5/2011 | Kawaoka et al. | |
| 2012/0216394 A1 | 8/2012 | Kitaura et al. | |
| 2013/0040206 A1* | 2/2013 | Yoshida | H01M 50/403 427/58 |
| 2014/0154584 A1 | 6/2014 | Nagase et al. | |
| 2014/0193689 A1* | 7/2014 | Takami | H01M 10/0585 429/120 |
| 2015/0188124 A1 | 7/2015 | Ichikawa | |
| 2015/0207177 A1 | 7/2015 | Ose et al. | |
| 2015/0325834 A1 | 11/2015 | Kato | |
| 2015/0325844 A1 | 11/2015 | Inoue | |
| 2016/0043430 A1 | 2/2016 | Lee et al. | |
| 2016/0218349 A1 | 7/2016 | Hasegawa et al. | |
| 2016/0260963 A1 | 9/2016 | Suzuki | |
| 2016/0268627 A1* | 9/2016 | Lee | H01M 4/587 |
| 2016/0380266 A1 | 12/2016 | Suzuki et al. | |
| 2018/0062162 A1 | 3/2018 | Maeda | |

FOREIGN PATENT DOCUMENTS

| | | |
|---|---|---|
| CN | 101997111 A | 3/2011 |
| CN | 102859780 A | 1/2013 |
| CN | 103733414 A | 4/2014 |
| CN | 104380515 A | 2/2015 |
| CN | 105580169 A | 5/2016 |
| CN | 106299443 A | 1/2017 |
| JP | 2013-157084 A | 8/2013 |
| JP | 2014-035812 A | 2/2014 |
| JP | 2014-143133 A | 8/2014 |
| JP | 2016-502746 A | 1/2016 |
| JP | 2016-162733 A | 9/2016 |
| JP | 2017-16793 A | 1/2017 |
| WO | 2010/064288 A1 | 6/2010 |
| WO | 2011/052094 A1 | 5/2011 |
| WO | 2011/105574 A1 | 9/2011 |
| WO | 2013/140565 A1 | 9/2013 |
| WO | 2014/016907 A1 | 1/2014 |
| WO | 2016/152262 A1 | 9/2016 |

OTHER PUBLICATIONS

International Search Report PCT/JP2018/001979 dated Apr. 3, 2018 with English translation.
Extended European Search Report dated Nov. 4, 2020 issued in corresponding European Patent Application No. 18743948.4 (7 pgs.).
Office Action dated Nov. 3, 2021, issued in corresponding Chinese Patent Application No. 201880008286.4 (8 pgs.).
Office Action dated Sep. 23, 2022, issued in corresponding Chinese Patent Application No. 201880008286.4 (14 pgs.).

* cited by examiner

ALL-SOLID-STATE BATTERY AND PRODUCTION METHOD OF THE SAME

CROSS-REFERENCE TO RELATED APPLICATIONS

This application is the U.S. National Phase of PCT/JP2018/001979, filed Jan. 23, 2018, which claims priority to Japanese Patent Application No. 2017-010387, filed Jan. 24, 2017. The subject matter of each of which is incorporated herein by reference in entirety.

TECHNICAL FIELD

The present invention relates to an all-solid-state battery including a solid electrolyte layer, and a production method of the same.

BACKGROUND ART

Various secondary batteries have been developed recently, among which lithium ion secondary batteries (LIBs) are seen as most promising because of their potential for high energy density. On the other hand, with expansion of the application range of batteries, there has been increasing attention for large-size batteries, such as automobile batteries and stationary batteries. In large-size batteries, securing safety is more important than in small-size batteries. Under such circumstances, high expectation is placed on all-solid-state batteries employing inorganic solid electrolyte, in which, as compared to batteries employing liquid electrolyte, safety can be easily secured even when the battery size is increased, and higher capacity can be easily achieved.

An all-solid-state battery typically includes an electrode group that includes a positive electrode, a negative electrode, and a solid electrolyte layer interposed therebetween. The solid electrolyte layer contains solid electrolyte. The positive electrode and the negative electrode each contain active material, and may contain solid electrolyte. The solid electrolyte layer is required to have high ion conductivity and reduced contact resistance between solid electrolyte particles.

The solid electrolyte layer is typically formed by applying a slurry containing a solid electrolyte on an electrode surface, and drying the slurry (Patent Literature 1). An electrode group formed by laminating the electrodes and the solid electrolyte layer are pressed at a pressure of approximately $5 \times 10^3$ kgf/cm² (Patent Literatures 1 and 2).

CITATION LIST

Patent Literature

[PTL 1] WO 2014/016907
[PTL 2] Japanese Patent Laid-Open No. 2013-157084

SUMMARY OF INVENTION

Technical Problem

In all-solid-state batteries, when a slurry is used to prepare a solid electrolyte, it is considered advantageous to use solid electrolyte particles with small average particle diameter. However, when solid electrolyte particles with small average particle diameter are used, it is difficult to sufficiently increase the packing density. Moreover, when the average particle diameter of the solid electrolyte particles is small, pressure unevenness occurs when forming a solid electrolyte layer by press-molding, resulting in density unevenness. The resultant solid electrolyte layer therefore tends to be warped.

Solution to Problem

One aspect of the present invention relates to an all-solid-state battery including: a positive electrode, a negative electrode, and a solid electrolyte layer interposed between the positive electrode and the negative electrode, wherein
at least one of the positive electrode and the negative electrode contains first solid electrolyte particles,
the solid electrolyte layer contains second solid electrolyte particles having ion conductivity, and
an average particle diameter D1 of the first solid electrolyte particles, and an average particle diameter D2 of the second solid electrolyte particles satisfy D2>D1.

Another aspect of the present invention relates to a production method of an all-solid-state battery, the method including:
a step of forming an electrode group that includes a positive electrode, a negative electrode, and a solid electrolyte layer interposed between the positive electrode and the negative electrode; and
a pressing step of pressing the electrode group, wherein
at least one of the positive electrode and the negative electrode contains first solid electrolyte particles,
in the step of forming the electrode group, the solid electrolyte layer is formed by using second solid electrolyte particles having ion conductivity by a dry process, and
an average particle diameter d1 of the first solid electrolyte particles used for the electrode, and an average particle diameter d2 of the second solid electrolyte particles used for the solid electrolyte layer satisfy d2>d1.

Advantageous Effects of Invention

In the all-solid-state battery, high ion-conductivity in the solid electrolyte layer can be secured, and warpage of the solid electrolyte layer can be suppressed.

Figure 1:
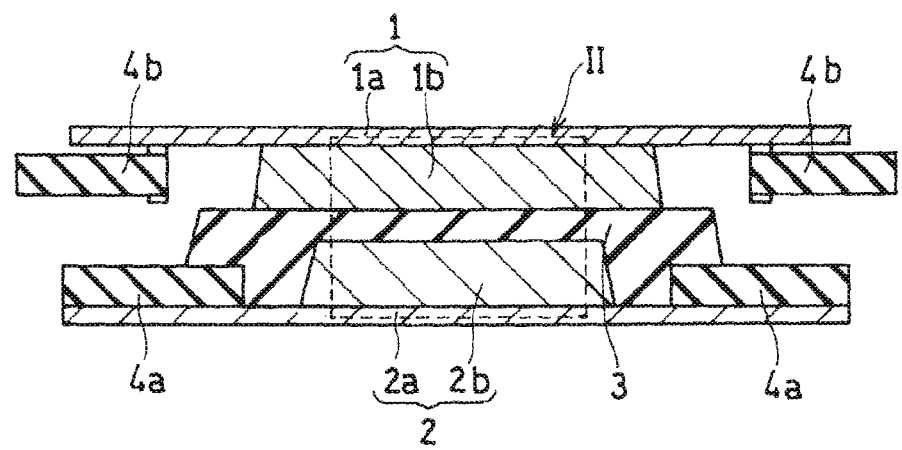
FIG. 1 A schematic vertical cross-sectional view of an electrode group included in an all-solid-state battery according to an embodiment of the present invention.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

An all-solid-state battery according to an embodiment of the present invention includes a positive electrode, a negative electrode, and a solid electrolyte layer interposed between the positive electrode and the negative electrode. At least one of the positive electrode and the negative electrode contains solid electrolyte particles (first solid electrolyte particles). The solid electrolyte layer contains ion-conductive solid electrolyte particles (second solid electrolyte particles). An average particle diameter D1 of the first solid electrolyte particles, and an average particle diameter D2 of the second solid electrolyte particles satisfy D2>D1.

The all-solid-state battery according to the present embodiment can be produced by a method including steps of: forming an electrode group that includes a positive electrode, a negative electrode, and a solid electrolyte layer interposed between the positive electrode and the negative electrode; and pressing the electrode group (pressing step). Here, at least one of the positive electrode and the negative electrode contains the first solid electrolyte particles. In the step of forming the electrode group, the solid electrolyte layer is formed by using the ion-conductive second solid electrolyte particles by a dry process. An average particle diameter d1 of the first solid electrolyte particles used for the electrode (specifically, as a material of the electrode), and an average particle diameter d2 of the second solid electrolyte particles used for the solid electrolyte layer (specifically, as a material of the solid electrolyte layer) satisfy d2>d1.

When a slurry is used to form a solid electrolyte layer, in view of enhancing the ion conductivity, it is considered advantageous to use solid electrolyte particles with small average particle diameter, thereby to increase contact area between particles, and reduce the thickness of the solid electrolyte layer. When employing a dry process, however, due to low flowability of the solid electrolyte particles whose average particle diameter is small, it is difficult to increase the packing density in the solid electrolyte layer, resulting in difficulty in obtaining high ion conductivity. If the flowability of the solid electrolyte particles is low, pressure unevenness increases when forming a solid electrolyte layer by press-molding. As a result, the density unevenness occurs in the solid electrolyte layer, which may cause the resultant solid electrolyte layer to be warped.

To address this, in the present embodiment, the average particle diameter D2 of the second solid electrolyte particles contained in the solid electrolyte layer is larger than the average particle diameter D1 of the first solid electrolyte particles contained in the electrode. Alternatively, the average particle diameter d2 of the second solid electrolyte particles used as a material of the solid electrolyte layer is larger than the average particle diameter d1 of the first solid electrolyte particles used as a material of the electrode. In a dry process, by increasing the flowability of the second solid electrolyte particles, the packing density in the solid electrolyte layer can be increased. High ion conductivity therein can be thus secured. In addition, unevenness in density of the second solid electrolyte particles in the solid electrolyte layer can be suppressed. Warpage of the solid electrolyte layer can be thus suppressed. On the other hand, in the electrode, in which the first solid electrolyte particles are used together with active material particles, it is necessary to increase the contact area between the first solid electrolyte particles and the active material particles. So, solid electrolyte particles whose average particle diameter D1 (or d1) is smaller than the average particle diameter D2 (or d2) are used, thereby to increase the contact area so that high ion conductivity can be secured.

The average particle diameter D1 of the first solid electrolyte particles and the average particle diameter D2 of the second solid electrolyte particles can be each determined on an electron microscope photograph of a cross section of the electrode and the solid electrolyte layer in the all-solid-state battery. Specifically, the average particle diameters D1 and D2 can be each obtained by measuring a particle diameter of a plurality of (e.g., 10) solid electrolyte particles selected at random on a cross section of each of the electrode and the solid electrolyte layer, and averaging the measured values. The particle diameter of the solid electrolyte particle herein refers to a diameter of a circle (equivalent circle) having an area equal to that of each solid electrolyte particle selected on the cross section.

The average particle diameter d1 of the first solid electrolyte particles and the average particle diameter d2 of the second solid electrolyte particles herein each refer to a median diameter ($D_{50}$) in a volumetric particle-size distribution measured using a laser diffraction particle size analyzer.

The solid electrolyte layer has a thickness of preferably 5 μm or more and 150 μm or less, and the thickness is preferably smaller than a thickness of the positive electrode and a thickness of the negative electrode. When a slurry is used to form a solid electrolyte layer, even after heat treatment, the solvent of the slurry, voids, or the like may remain in the solid electrolyte layer. This may result in increased resistance within the layer, or increase the likelihood of short circuit. In the present embodiment, by employing a dry process and using the second solid electrolyte particles with high flowability, it is possible to form a highly-dense solid electrolyte layer even with such a thickness. Therefore, the solid electrolyte layer can be made thinner, and besides, interlayer resistance can be reduced, leading to a higher energy density of the all-solid-state battery.

In a preferred embodiment, the average particle diameter D2 is 1 μm or more and 50 μm or less, and equal to or less than a half of the thickness of the solid electrolyte layer. In this case, the solid electrolyte particles can have better flowability than in the case of using particles having the average particle diameter D1. This can easily further improve the packing density in the solid electrolyte layer, leading to higher ion conductivity in the solid electrolyte layer. Moreover, the solid electrolyte layer can be made thinner, leading to a higher energy density of the all-solid-state battery.

The average particle diameter D1 is, for example, 0.01 μm or more and 10 μm or less. By making the particle diameter of the solid electrolyte to be mixed with active material as small as possible, the solid electrolyte particles can be finely mixed with the active material particles, which increases the contact area with the active material particles, leading to improved battery characteristics.

The second solid electrolyte particles may include a first group of particles each having a particle diameter of 1 μm or more, and a second group of particles each having a particle diameter of less than 1 μm. An average particle diameter D21 of the first group of particles, an average particle diameter D22 of the second group of particles, and the average particle diameter D1 preferably satisfy D21>D1>D22. By using the first group of particles having a large average particle diameter, high flowability when forming a solid electrolyte layer can be secured. Furthermore, by using the first group of particles in combination with the second group of particles having a small average particle diameter, the contact area of the first group of particles with wall surfaces (e.g., an inner wall surface of a die or mask used in forming a solid electrolyte layer) can be reduced, leading to improved flowability. Therefore, warpage of the solid electrolyte layer can be further suppressed.

The particle diameter of the solid electrolyte particles constituting the first group of particles and the second group of particles can be determined in the aforementioned manner. The average particle diameter D21 of the first group of particles and the average particle diameter D22 of the second group of particles can be each determined similarly to the average particle diameter D2. Here, on a cross-section photograph of the solid electrolyte layer, with respect to randomly-selected solid electrolyte particles having a particle diameter of 1 μm or more, the average particle diameter D21 is determined; with respect to randomly-selected solid electrolyte particles having a particle diameter of less than 1 μm the average particle diameter D22 is determined.

In view of obtaining a high packing density, the first group of particles are contained in the solid electrolyte layer at a ratio of 50 vol % or more.

The ratio of the first group of particles in the solid electrolyte layer can be determined on an electron microscope photograph of a cross section of the solid electrolyte layer. Specifically, in a region having a predetermined area of a cross section of the solid electrolyte layer, a ratio of the area (area %) of the solid electrolyte particles having a particle diameter of 1 μm or more is determined, and the ratio of the area is taken as corresponding to a ratio of the volume (vol %) of the first group of particles contained in the solid electrolyte layer. To secure the reliability of the measurement, the region to be observed on an electron microscope photograph is preferably a rectangular region having, for example, a width and a length each 10 times or more larger than the average particle diameter of the first group of particles.

In the all-solid-state battery according to the present embodiment, the flowability of the solid electrolyte particles when forming a solid electrolyte layer by a dry process can be enhanced, and thereby the packing density in the solid electrolyte layer can be improved. In the all-solid-state battery, the packing density in the solid electrolyte layer is, for example, 99 vol % or more.

The packing density in the solid electrolyte layer can be determined, for example, on an electron microscope photograph of a cross section of the solid electrolyte layer. Specifically, the cross-section photograph of the solid electrolyte layer is thresholded to distinguish voids from a portion other than voids. Then, in a region having a predetermined area on the cross-section photograph, a ratio of the area (area %) of the portion other than voids is determined, and the ratio of the area is taken as corresponding to a packing density by volume (vol %) in the solid electrolyte layer. To secure the reliability of the measurement, the region to be observed on an electron microscope photograph is preferably a rectangular region having, for example, a width and a length each 10 times or more larger than the average particle diameter of the second solid electrolyte particles.

In the pressing step of the aforementioned production method, the electrode group is pressed at a pressure of 100 MPa or more and 1500 MPa or less. Applying such a high pressure tends to allow the solid electrolyte particles to be plastically deformed, which can easily enhance the packing density in the solid electrolyte layer. In addition, using the second solid electrolyte particles can easily enhance the flowability. Therefore, even when such a pressure is applied to the electrode group, warpage of the solid electrolyte layer can be suppressed.

In the present embodiment, by enhancing the flowability of the second solid electrolyte particles, the packing density in the solid electrolyte layer can be increased, even without using an organic component, such as a binder or a dispersion medium (esp., binder). Accordingly, in the step of forming a solid electrolyte layer, it is not particularly necessary to use an organic component like a binder. Moreover, by not using an organic component like a binder, the solid electrolyte layer can be free of voids which would otherwise be left after removal of an organic component like a binder. For these reasons also, the packing density in the solid electrolyte layer can be increased.

A more detailed description will be made of the all-solid-state battery and the production method thereof according to the present embodiment.

(Solid Electrolyte Layer)

The solid electrolyte layer interposed between the positive electrode and the negative electrode contains the second solid electrolyte particles having ion conductivity.

A preferable example of the above solid electrolyte is an ion-conductive solid electrolyte (e.g., inorganic solid electrolyte) that plastically deforms at a pressure of 100 MPa or less. In the case of using such a solid electrolyte, when the electrode group or the battery is pressed, the second solid electrolyte particles are plastically deformed and densely packed. This can reduce the space between the second solid electrolyte particles. As a result, the packing density in the solid electrolyte layer can be further increased. Furthermore, in view of securing high ion conductivity in the solid electrolyte layer, a solid electrolyte having an ion conductivity of $10^{-4}$ S/cm or more is preferred. Among such solid electrolytes, a sulfide (sometimes referred to as a sulfide-series solid electrolyte (specifically, a sulfide-series inorganic solid electrolyte)), and a hydride (sometimes referred to as a hydride-series solid electrolyte) are particularly preferred. The crystalline state of the solid electrolyte is not limited, and may be either crystalline or amorphous.

A preferred example of the sulfide is a sulfide containing Li and P. Specific examples of the sulfide include $Li_2S$—$SiS_2$, $Li_2S$—$P_2S_5$, $Li_2S$—$GeS_2$, $Li_2S$—$B_2S_3$, $Li_2S$—$Ga_2S_3$, $Li_2S$—$Al_2S_3$, $Li_2S$—$GeS_2$—$P_2S_5$, $Li_2S$—$Al_2S_3$—$P_2S_5$, $Li_2S$—$P_2S_3$, $Li_2S$—$P_2S_3$—$P_2S_5$, LiX—$Li_2S$—$P_2S_5$, LiX—$Li_2S$—$SiS_2$, and LiX—$Li_2S$—$B_2S_3$ (X: I, Br, or Cl).

An example of the hydride is a complex hydride of lithium borohydride. Specific examples of the complex hydride include $LiBH_4$—LiI-based complex hydride and $LiBH_4$—$LiNH_2$-based complex hydride.

The solid electrolyte may be used singly or, if necessary, in combination of two more kinds.

The solid electrolytes contained in the positive electrode and the negative electrode may be of the same kind or different kinds.

In the present embodiment, it is important to adjust the average particle diameter of the solid electrolyte particles such that the average particle diameters D1 of the first solid electrolyte particles contained in the positive electrode and/or the negative electrode and the average particle diameter D2 of the second solid electrolyte particles contained in the solid electrolyte layer satisfy D2>D1. By setting to D2>D1, as mentioned above, a high packing density can be obtained in the solid electrolyte layer, while high ion conductivity can be secured in the electrode.

A ratio of the average particle diameter D2 to the average particle diameter D1 (=D2/D1) is, for example, 2 or more and 200 or less, preferably 2.5 or more and 40 or less, more preferably 3 or more and 15 or less. When D2/D1 is within such a range, a high packing density in the solid electrolyte layer and high ion conductivity in the electrode can be obtained in a well-balanced manner.

The average particle diameter D2 is, for example, 1 μm or more and 50 μm or less, preferably 3 μm or more and 30 μm or less (e.g., 5 μm or more and 30 μm or less), more preferably 5 μm or more and 25 μm or less (e.g., 10 μm or more and 25 μm or less). When the average particle diameter D2 is within such a range, the packing density in the solid electrolyte layer can be easily further increased.

The average particle diameter D2 is preferably equal to or less than a half of the thickness of the solid electrolyte layer, more preferably equal to or less than a third thereof. When the average particle diameter D2 and the thickness of the solid electrolyte layer have such a relationship, the solid electrolyte layer can be easily made thinner. Also, the internal short circuit can be easily suppressed.

The second solid electrolyte particles can include, for example, a first group of particles each having a particle diameter of 1 μm or more and a second group of particles each having a particle diameter of less than 1 μm. An average particle diameter D21 of the first group of particles and an average particle diameter D22 of the second group of particles, and the average particle diameter D1 of the first solid electrolyte particles preferably satisfy D21>D1>D22. When these average particle diameters have such a relationship, while good flowability of the second solid electrolyte particles can be secured, warpage of the solid electrolyte layer can be further suppressed.

The average particle diameter D21 is, for example, 5 μm or more and 20 μm or less, preferably 8 μm or more and 15 μm or less. By using the first group of particles having the average particle diameter D21 within such a range, D2 can be controlled to be larger than D1, and favorable packing state in the solid electrolyte layer can be easily secured.

The average particle diameter D22 is, for example, 1 nm or more and 100 nm or less, preferably 5 nm or more and 50 nm or less. By using the second group of particles having the average particle diameter D22 within such a range, the contact area of the particles of the first group having the average particle diameter D21 with other particles or wall surfaces can be reduced. Consequently, the flowability of powder can be improved, and warpage of the solid electrolyte layer can be further reduced.

Although depending on the physical properties of the solid electrolyte particles to be used, the ratio of the first group of particles contained in the solid electrolyte layer is preferably 50 vol % or more. The upper limit of the ratio of the first group of particles in the layer is, for example, 99 vol % or less. When the first group of particles are contained at such a ratio in the solid electrolyte layer, high flowability of the second solid electrolyte particles can be secured.

In the all-solid-state battery according to the present embodiment, the packing density in the solid electrolyte layer can be increased to as high as, for example, 99 vol % or more, preferably 99.5 vol % or more. Such a high packing density makes it possible to obtain high ion conductivity in the solid electrolyte layer, and easily reduce the resistance.

The solid electrolyte layer may contain, if necessary, a known additive used for the solid electrolyte layer of all-solid-state batteries. However, by using soft particles as the second solid electrolyte particles, excellent adhesion can be achieved between the second solid electrolyte particles. Therefore, it is not particularly necessary to use a binder, such as a resin.

The solid electrolyte layer, in view of securing high ion conductivity, preferably contains no residue of organic components, such as a binder and a dispersion medium. Even though the solid electrolyte layer contains a residue of organic components, such as a binder and a dispersion medium, the amount of the residue of organic components (esp., binder) in the solid electrolyte layer is preferably 1 mass % or less, more preferably 0.5 mass % or less. The "residue of organic components" includes the organic components themselves, such as the binder and the dispersion medium, and a component produced by decomposition of the organic components, such as the binder and the dispersion medium.

The amount of the residue of organic components, such as the binder and the dispersion medium, can be determined by using, for example, gas chromatography mass spectrometry (GC/MS) technique.

The solid electrolyte layer has a thickness of, for example, 5 μm or more and 150 μm or less, more preferably 5 μm or more and 100 μm or less, or 5 μm or more and 50 μm or less. The thickness of the solid electrolyte layer may be equal to that of the positive electrode and/or that of the negative electrode, or larger than that of the positive electrode and/or that of the negative electrode. Preferably, the thickness of the solid electrolyte layer is smaller than that of the positive electrode and that of the negative electrode. By using the second solid electrolyte particles with high flowability, such a small thickness can be realized. Moreover, the resistance of the solid electrolyte layer can be reduced, and the volume of the electrode can be increased, which leads to a high energy density.

(Positive Electrode)

The positive electrode needs to contain a positive electrode active material, and may contain a known component used for the positive electrode in all-solid-state batteries, in addition to the positive electrode active material. In view of enhancing the ion conductivity in the positive electrode, the positive electrode preferably contains a solid electrolyte that exhibits ion conductivity, together with the positive electrode active material.

As the positive electrode active material, any positive electrode active material as used in all-solid-state batteries may be used without limitation. Examples of the positive electrode active material used in all-solid-state LIBs include: oxides, such as a lithium-containing oxide containing cobalt, nickel, and/or manganese [e.g., lithium cobalt oxide (LiCoO$_2$), lithium nickel oxide (LiNiO$_2$), lithium manganese oxide (e.g., a spinel-type lithium manganese oxide (e.g., LiMn$_2$O$_4$), a lithium nickel cobalt manganese oxide), LiNi$_{0.8}$Co$_{0.15}$Al$_{0.05}$O$_2$], and a Li-excess composite oxide (Li$_2$MnO$_3$—LiMO$_2$); and compounds other than oxides. Examples of the compounds other than oxides include an olivine-type compound (LiMPO$_4$), and a sulfur-containing compound (e.g., Li$_2$S). In the above formulae, M represents a transition metal. The positive electrode active material may be used singly or in combination of two or more kinds. In view of obtaining of a high capacity, a lithium-containing oxide containing at least one selected from the group consisting of Co, Ni, and Mn is preferred. The lithium-containing oxide may further contain a typical metal element, such as Al. Examples of the lithium-containing oxide containing Al include an aluminum-containing lithium nickel cobalt oxide.

In view of enhancing the conductivity in the positive electrode, a positive electrode active material having an electric conductivity of 10$^{-4}$ S/cm or more (preferably 10$^{-2}$ S/cm or more) is preferred. Enhanced conductivity leads to favorable charge and discharge characteristics. Among such positive electrode active materials, examples thereof used in all-solid-state LIBs include LiNi$_{0.8}$Co$_{0.15}$Al$_{0.05}$O$_2$, LiCoO$_2$, and LiNi$_{1/3}$Co$_{1/3}$Mn$_{1/3}$.

The positive electrode active material particles may be coated particles with a metal oxide coating. The metal oxide needs to have a function to suppress the diffusion of elements at the interface between the positive electrode active material particles and the solid electrolyte particles, and may be a composite oxide. Examples of the metal oxide include Li-conductive composite oxides (e.g., $Li_4Ti_5O_{12}$, $LiNbO_3$, $Li_2ZrO_3$), and oxides, such as $Al_2O_3$ and $ZrO_2$.

The positive electrode active material has an average particle diameter of, for example, 1 μm or more and 20 μm or less, preferably 3 μm or more and 15 μm or less.

The average particle diameter of the positive electrode active material is a median diameter ($D_{50}$) in a volumetric particle-size distribution measured using a laser diffraction particle size analyzer.

As the solid electrolyte, any solid electrolyte that exhibits ion conductivity suitable for all-solid-state batteries can be used; for example, a solid electrolyte as used for the solid electrolyte layer in all-solid-state batteries can be used. In the all-solid-state battery according to the present embodiment, it suffices if at least one of the positive electrode and the negative electrode contains the first solid electrolyte particles, and both of the positive electrode and the negative electrode may contain the first solid electrolyte particles. For the convenience of description, when solid electrolyte particles are contained in both the positive electrode and the negative electrode, both solid electrolyte particles are referred to as the first solid electrolyte particles; however, the first solid electrolyte particles contained in the positive electrode and those contained in the negative electrode may be different or the same in kind and average particle diameter.

Examples of the first solid electrolyte particles include solid electrolytes exemplified for use in the solid electrolyte layer, among which a sulfide is preferred.

The average particle diameter D1 of the first solid electrolyte particles is, for example, 0.01 μm or more and 10 μm or less, preferably 0.5 μm or more and 8 μm or less, more preferably 1 μm or more and 5 μm or less. When the average particle diameter D1 is within such a range, the contact area with the positive electrode active material particles can be further increased.

A ratio of the solid electrolyte to the total amount of the positive electrode active material and the solid electrolyte is not limited to a particular value; however, in view of securing high ion conductivity in the positive electrode, the ratio is, for example, 5 mass % or more and 50 mass % or less, preferably 20 mass % or more and 40 mass % or less, The positive electrode may include a positive electrode current collector, and a positive electrode active material or a positive electrode mixture supported on the positive electrode current collector. The positive electrode mixture is a mixture containing a positive electrode active material and a solid electrolyte.

The positive electrode current collector may be any positive electrode current collector used in all-solid-state batteries. The positive electrode current collector may be in the form of, for example, a metal foil, a plate-like member, or a powder assembly. The positive electrode current collector may be a film of a material of the positive electrode current collector. The metal foil may be, for example, an electrolytic foil, or an etched foil.

Desirably, the positive electrode current collector is sturdy enough not to wave or break when forming a positive electrode active material layer.

The material of the positive electrode current collector is, for example, a material stable at an oxidation reduction potential of the positive electrode, such as aluminum, magnesium, stainless steel, titanium, iron, cobalt, zinc, tin, or alloys of these. For example, in all-solid-state LIBs, a material that does not form an alloy with lithium is used for the positive electrode current collector.

The thickness of the positive electrode current collector is, for example, 4 μm or more, and may be 5 μm or more. The thickness of the positive electrode current collector is, for example, 50 μm or less, preferably 30 μm or less, more preferably 20 μm or less. These lower limits and upper limits can be combined in any combination.

The positive electrode has a thickness of, for example, 50 μm or more and 200 μm or less.

(Negative Electrode)

The negative electrode needs to contain a negative electrode active material, and may contain a known component used for the negative electrode in all-solid-state batteries, in addition to the negative electrode active material. In view of enhancing the ion conductivity in the negative electrode, the negative electrolyte preferably contains a solid electrolyte that exhibits ion conductivity, together with the negative electrode active material.

As the negative electrode active material, any material can be used as long as it is capable of intercalating and deintercalating ions that act as a charge carrier depending on the type of all-solid-state batteries, and a known negative electrode active material as used in all-solid-state batteries can be used. For example, in all-solid-state LIBs, examples of the negative electrode active material include a carbonaceous material capable of intercalating and deintercalating lithium ions, and a simple substance, alloy or compound of metals or semimetals capable of intercalating and deintercalating lithium ions. Examples of the carbonaceous material include graphite (e.g., natural graphite, artificial graphite), hard carbon, and amorphous carbon. Examples of the simple substance or alloy of metals and semimetals include lithium metal or alloy, and simple Si. Examples the compound include an oxide, a sulfide, a nitride, a hydride, and a silicide (e.g. lithium silicide). Examples of the oxide include a titanium oxide, and a silicon oxide. The negative electrode active material may be used singly, or in combination of two or more kinds. For example, a silicon oxide and a carbonaceous material may be used in combination.

In all-solid-state LIBs, the negative electrode active material is preferably graphite, more preferably coated particles comprising graphite particles and an amorphous carbon coating. By using graphite with low crystal orientation, expansion and contraction evenly occur in multiple directions. Therefore, capacity reduction due to repetitive charge and discharge can be suppressed. Furthermore, by using coated particles, intercalation and deintercalation of lithium ions occurs all over the surfaces of the particles, allowing the interface reaction to proceed smoothly.

As the solid electrolyte, any solid electrolyte that exhibits ion conductivity suitable for all-solid-state batteries can be used; for example, a solid electrolyte as used for the solid electrolyte layer in all-solid-state batteries can be used. As mentioned above, the negative electrode may contain the first solid electrolyte particles. Examples of the first solid electrolyte particles include solid electrolytes exemplified for used in the solid electrolyte layer, among which a sulfide is preferred.

The average particle diameter D1 of the first solid electrolyte particles can be selected from the range mentioned above for the positive electrode.

A ratio of the solid electrolyte to the total amount of the negative electrode active material and the solid electrolyte can be selected as appropriate from the range mentioned above as the ratio of the solid electrolyte to the total amount of the positive electrode active material and the solid electrolyte.

The negative electrode may include a negative electrode current collector, and a negative electrode active material or a negative electrode mixture supported on the negative electrode current collector. The negative electrode mixture is a mixture containing a negative electrode active material and a solid electrolyte. Example of the form of the negative electrode current collector include those exemplified for the positive electrode current collector. The material of the negative electrode current collector is, for example, a material stable at an oxidation reduction potential of the negative electrode, such as copper, nickel, stainless steel, titanium, or alloys of these. For example, in all the solid LIBs, a material that does not form an alloy with lithium is used for the negative electrode current collector.

The thickness of the negative electrode current collector is, for example, 4 µm or more, and 10 µm or more. The thickness of the negative electrode current collector is, for example, 50 µm or less, and preferably 30 µm or less, more preferably 20 µm or less. These lower limits and upper limits can be combined in any combination.

The negative electrode has a thickness of, for example, 50 µm or more and 200 µm or less.

Figure 2A:
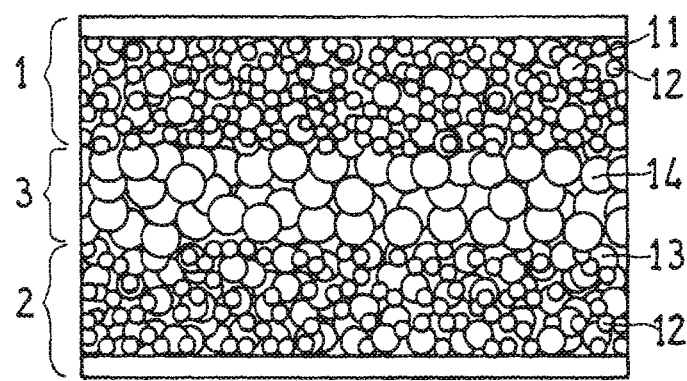
FIG. 2A A schematic enlarged cross-sectional view of a region II of FIG. 1.

FIG. 1 is a schematic vertical cross-sectional view of an electrode group included in the all-solid-state battery according to the preset embodiment. FIG. 2A is a schematic enlarged cross-sectional view of a region II of FIG. 1. The electrode group included in the all-solid-state battery includes a positive electrode 2, a negative electrode 1, and a solid electrolyte layer 3 interposed therebetween. The positive electrode 2 includes a positive electrode collector 2a, and a positive electrode active material layer (positive electrode layer) 2b carried thereon. The negative electrode 1 includes a negative electrode current collector 1a, and a negative electrode active material layer 1b carried thereon. The positive electrode 2 and the negative electrode 1 are disposed such that the positive electrode active material layer 2b and the negative electrode active material layer 1b face each other. A solid electrolyte layer 3 is disposed between the positive electrode active material layer 2b and the negative electrode active material layer 1b.

The negative electrode 1 contains negative electrode active material particles 11 and first solid electrolyte particles 12; the positive electrode 2 includes positive electrode active material particles 13 and the first solid electrolyte particles 12. While FIG. 2A shows an example where both the positive electrode 2 and the negative electrode 1 contain the first solid electrolyte particles 12, this should not be taken as a limitation. It suffices if at least either one of the positive electrode 2 and the negative electrode 1 contains the first solid electrolyte particles 12. The solid electrolyte layer 3 contains second solid electrolyte particles 14. An average particle diameter D1 of the first solid electrolyte particles 12 and an average particle diameter D2 of the second solid electrolyte particles 14 satisfy D2>D1.

Figure 2B:
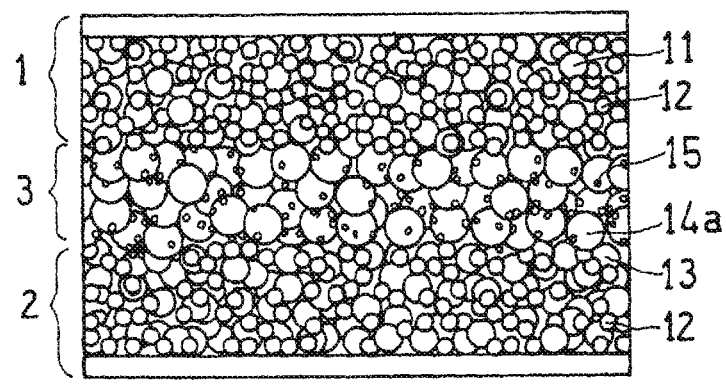
FIG. 2B A schematic enlarged cross-sectional view of part of an electrode group included in the all-solid-state battery according to another embodiment.

FIG. 2B shows an example where the solid electrolyte layer 3 contains a first group of particles comprising solid electrolyte particles 14a each having a particle diameter of 1 µm or more, and a second group of particles comprising solid electrolyte particles 15 each having a particle diameter of less than 1 µm. In the FIG. 2B example, preferably, an average particle diameter D21 of the first group of particles, an average particle diameter D22 of the second group of particles, and the average particle diameter D1 of the first solid electrolyte particles contained in the positive electrode 2 and/or the negative electrode 1 satisfy D21>D1>D22.

In the FIG. 1 example, the positive electrode active material layer 2b and the negative electrode active material layer 1b are both square in shape, having a predetermined thickness. On the positive electrode current collector 2a, an annular electrically-insulating layer 4a is disposed so as to surround the positive electrode active material layer 2b; on the negative electrode current collector 1a, an annular electrically-insulating layer 4b is disposed so as to surround the negative electrode active material layer 1b. The insulating layers 4a and 4b serve to prevent short circuit between the positive electrode current collector 2a and the negative electrode current collector 1a. The positive electrode current collector 2a is a square metal foil which is larger in size than the positive electrode active material layer 2b; the negative electrode current collector 1a is a square metal sheet which is larger in size than the negative electrode active material layer 1b. The solid electrolyte layer 3 is configured to cover the top and side surfaces of the positive electrode active material layer 2b, and the top and side surfaces of the insulating layer 4a on the inner circumference side.

The all-solid-state battery can be obtained by housing the electrode group in a battery case. To each of the positive electrode and the negative electrode of the electrode group, a lead is connected at its one end. The leads are, at their other ends, electrically connected to external terminals, which are extended outside the battery case.

The all-solid-state battery may be of various shape types, without limited to the example illustrated in FIG. 1, such as a circular type, a cylindrical type, a square type, and thin-layer flat type. The electrode group may include a plurality of positive electrodes and/or a plurality of negative electrodes. While FIG. 1 shows an example where the positive electrode active material layer and the negative electrode active material layer are square in shape, this should not be taken as a limitation. The shape of the component members of the all-solid-state battery can be selected as appropriate from, for example, a rectangular shape, a diamond shape, a circular shape, and an oval shape.

Examples of the all-solid-state battery according to the present embodiment include: all-solid-state alkali metal ion batteries, such as all-solid-state LIBs and all-solid-state sodium ion batteries; and all-solid-state multivalent ion batteries, such as all-solid-state alkaline earth metal batteries.

The all-solid-state battery according to the present embodiment can be produced by a method including a step of forming an electrode group, and a pressing step of applying pressure to the electrode group. Description of each step will be given below.

(Step of Forming Electrode Group)

In the step of forming an electrode group, the solid electrolyte layer is formed by using the ion-conductive second solid electrolyte particles by a dry process. In forming the solid electrolyte layer, it is preferable to distribute the particles as uniformly as possible.

The step of forming an electrode group may include, for example, a step of forming a solid electrolyte layer by a dry process, and a step of preparing (or forming) a positive electrode and a negative electrode. These steps may be performed in any order. For example, one of the positive electrode and the negative electrode (first electrode) may be formed first. Then, the solid electrolyte layer may be formed on one of the principal surfaces of the first electrode, and the other electrode (second electrode) may be formed on the other principal surface of the solid electrolyte layer on the opposite side to the first electrode. Alternatively, the solid electrolyte layer may be formed first. Then, the first electrode may be formed on one of the principal surfaces of the solid electrolyte layer, and the second electrode may be formed on the other principal surface of the solid electrolyte layer, thereby to form the electrode group. When laminating the solid electrolyte layer and the electrode together, a pressure may be applied, if necessary, to form the solid electrolyte layer and the electrode into a composite. Especially in the case of forming the solid electrolyte layer first, preferably, after the first electrode is laminated on the solid electrolyte layer, a pressure is applied to the laminate in the thickness direction, to form them into a composite. After the solid electrolyte layer and the first electrode are formed into a composite, preferably, the composite is turned upside down, and the second electrode is formed on the solid electrolyte layer on the opposite side to the first electrode.

It suffices if one of the electrodes contains the first solid electrolyte particles, and the other electrode may or may not contain the first solid electrolyte particles.

When the electrode group includes a plurality of positive electrodes and/or negative electrodes and a plurality of solid electrolyte layers, the electrodes and the solid electrolyte layer need to be laminated together such that the solid electrolyte layer is interposed between the positive electrode and the negative electrode.

(Step of Forming (or Preparing) Electrode)

The positive electrode can be obtained by, for example, a dry process using a positive electrode active material or mixture. The positive electrode may be formed by forming a layer of a positive electrode active material or positive electrode mixture on a surface of the positive electrode current collector. The negative electrode can be formed in a similar manner to that of the positive electrode, using a negative electrode active material or negative electrode mixture, and, if necessary, a negative electrode current collector. The active material layer (or mixture layer) of the positive electrode and the negative electrode may be formed by either a dry process or a wet process. The thy process may be electrostatic screen printing process as applied to the below-mentioned formation of the solid electrolyte layer.

The active material or mixture layer of the positive electrode and the negative electrode may be compact-molded, if necessary. The compacting pressure is, for example, 1 MPa or more and 5 MPa or less.

The average particle diameter d1 of the first solid electrolyte particles used for the electrode can be selected, for example, from the range mentioned above for the average particle diameter D1. When the average particle diameter d1 is within such a range, the contact area with the active material particles can be further increased.

(Step of Forming Solid Electrolyte Layer)

In this step, the solid electrolyte layer is formed by using the second solid electrolyte particles by a dry process.

In the case of forming a solid electrolyte layer after one of the electrodes is formed, the solid electrolyte layer can be formed by a dry process using second solid electrolyte particles or using a mixture containing second solid electrolyte particles (e.g., mixture containing second solid electrolyte particles and an additive) and compacting the particles into a film, on at least one of the principal surfaces of one of the electrodes.

The compacting pressure is, for example, 1 MPa or more and 5 MPa or less. As mentioned above, in the step of forming a solid electrolyte layer, it is preferable not to use an organic component, such as a binder (e.g., resin) and a dispersion medium.

The dry process can be performed by any known method, but is preferably performed by electrostatic screen printing.

Figure 3:
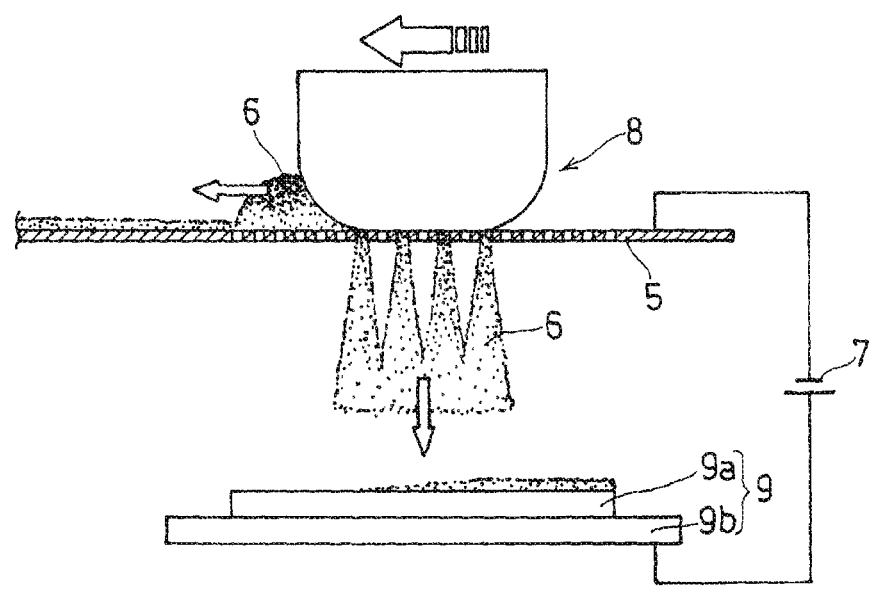
FIG. 3 A schematic diagram for explaining a step of forming a solid electrolyte layer by electrostatic screen printing, in a production method of an all-solid-state battery according to an embodiment of the present invention.

FIG. 3 is a schematic diagram for explaining a step of forming a solid electrolyte layer by electrostatic screen printing. In electrostatic screen printing, a powder material 6 for forming a solid electrolyte layer is electrically charged using a mesh-like screen 5, and the powder material 6 is deposited like a film on an electrode 9 which is electrically charged to have a polarity opposite to that of the powder material 6. The screen 5 is connected to a power source (DC power source) 7. The powder material 6 is rubbed down into the screen 5 using a rubbing member 8, such as a resin sponge, so that the powder material 6 is brought into contact with the screen 5 and electrically charged.

The electrode 9 on which the powder material 6 is deposited may be either the positive electrode or the negative electrode used for all-solid-state batteries. In the illustrated example, the electrode 9 includes an active material layer 9a and a current collector 9b supporting the active material layer 9a, with the current collector 9b connected to the power source 7. In depositing the powder material 6, the electrode 9 is electrically charged to have a polarity opposite to that of the screen 5 (i.e., the electrically-charged powder material 6). The powder material 6 which has been electrically charged by contact with the screen 5 is electrostatically induced by the electrode 9 having the opposite polarity, and deposits on the electrode 9. The powder material 6 preferentially deposits on a region where the electrode 9 is exposed and a region where the amount of the powder material 6 deposited on the electrode 9 is small. Therefore, according to electrostatic screen printing, a solid electrolyte layer with the powder material 6 evenly distributed therein can be formed.

While FIG. 3 shows an example where the powder material 6 is negatively charged, while the electrode 9 is positively charged, this should not be taken as a limitation. The powder material 6 may be positively charged, and the electrode 9 may be negatively charged.

There is no particular limitation on the apparatus and component members for screen printing, and commercially available ones may be used. For example, an electrically-conductive mesh (e.g., stainless steel mesh) can be used as the screen. The screen may be a mesh used for screen printing. Details of the mesh, such as the opening shape, the mesh number, the wire diameter, and the material, can be adjusted as appropriate, depending on the physical properties and type of the powder material, the size and quality of the solid electrolyte layer, and others.

The average particle diameter d2 of the second solid electrolyte particles contained in the solid electrolyte layer is larger than the average particle diameter d1 of the first solid electrolyte particles. A ratio of the average particle diameter d2 to the average particle diameter d1 (=d2/d1) can be selected, for example, from the range mentioned above for D2/D1. The average particle diameter d2 of the second solid electrolyte particles can be selected, for example, from the range mentioned above for the average particle diameter D2. When the average particle diameter d2 is within such a range, the packing density in the solid electrolyte layer can be further enhanced. The average particle diameter d2, like the average particle diameter D2, is preferably equal to or less than a half, or equal to or less than a third of the thickness of the solid electrolyte layer.

The second solid electrolyte particles used for the solid electrolyte layer preferably include a first group of particles each having a particle diameter of 1 μm or more, and a second group of particles each having a particle diameter of less than 1 μm. The average particle diameter d21 of the first group of particles and the average particle diameter d22 of the second group of particles used for the solid electrolyte layer can be respectively selected from the ranges mentioned above for the average particle diameter D21 of the first group of particles and the average particle diameter D22 of the second group of particles. Moreover, like D21 and D22, d21 and d22 preferably satisfy d21>d1>d22.

The average particle diameter d21 of the first group of particles and the average particle diameter d22 of the second group of particles are both a median diameter ($D_{50}$) in a volumetric particle-size distribution measured using a laser diffraction particle size analyzer.

(Pressing Step)

In this step, the formed electrode group is pressed. By this pressing, the second solid electrolyte particles contained in the solid electrolyte layer and the solid electrolyte particles contained in the electrode are plastically deformed, allowing the particles to adhere to each other. Since the second solid electrolyte particles adhere to each other, the packing density in the solid electrolyte layer can be enhanced. Also, since the solid electrolyte particles are plastically deformed, the adhesion between the solid electrolyte layer and the positive electrode and/or the negative electrode can be improved.

The electrode group is housed in a battery case. The pressing of the electrode group may be performed either before or after housed in the battery case. For example, when the battery case is made of a laminate film, after the electrode group is housed in the battery case, the electrode group together with the battery case (i.e., battery) may be pressed.

The pressure when pressing the electrode group is preferably higher than a pressure at which the second solid electrolyte particles (and the solid electrolyte particles in the electrode) plastically deform, more preferably above 100 MPa, further more preferably 400 MPa or more and 1500 MPa or less, or 400 MPa or more and 1200 MPa. Applying such a pressure to the electrode group (or battery) allows the second solid electrolyte particles contained in the solid electrolyte layer and the solid electrolyte particles contained in the electrode to be easily plastically deformed.

EXAMPLE

The present invention will be specifically described below with reference to Examples and Comparative Example. The present invention, however, is not limited to the following Examples.

Example 1

(1) Fabrication of all-Solid-State Battery

An all-solid-state battery as illustrated in FIG. 1 (all-solid-state LIB) was fabricated in the following procedures.

(a) Fabrication of Positive Electrode 2

$LiNi_{0.8}Co_{0.15}Al_{0.05}O_2$ (average particle diameter $D_{50}$: 12.32 μm) serving as a positive electrode active material, and $Li_2S$—$P_2S_5$ solid solution (average particle diameter $D_{50}$ (d1): 3.6 μm, ion conductivity: $3.0 \times 10^{-3}$ S/cm) serving as a lithium ion-conductive solid electrolyte were mixed at a mass ratio of 7:3 in a ball mill, to give a mixture.

On one surface of an aluminum foil of 66 mm long, 66 mm wide, and 20 μm thick serving as a positive electrode collector 2a, an electrically insulating layer 4a having a square opening of 51 mm long and 55 mm wide was disposed so as to surround a positive electrode active material layer 2b. A mask having an opening of 50 mm long and 50 mm wide was placed over the aluminum foil with the insulating layer disposed thereon. The above mixture was formed into a positive electrode active material layer 2b by a dry process employing an electrostatic screen method. Specifically, the mixture was deposited in a predetermined amount so as to cover the opening of the mask by electrostatic screen printing, according to the aforementioned procedures. The screen used here was a stainless-steel mesh having a mesh number 300/inch (=2.54 cm), a wire diameter of 30 μm, and an opening of 55 μm. The deposited mixture was pressed in the thickness direction at a pressure of 2 MPa using a single action press, to form the positive electrode active material layer 2b. The amount of the positive electrode active material layer 2b per unit area was 22.5 mg/cm².

(b) Fabrication of Solid Electrolyte Layer 3

With a mask having an opening of 54 mm long and 54 mm wide placed over the positive electrode 2 on the positive electrode active material layer 2b side, the solid electrolyte layer 3 was formed by a dry process employing electrostatic screen printing in a similar manner to that of forming the positive electrode active material layer. Specifically, $Li_2S$—$P_2S_5$ solid solution (average particle diameter $D_{50}$ (d2): 10.20 μm, ion conductivity: $2.2 \times 10^{-3}$ S/cm) serving as a lithium ion-conductive solid electrolyte was deposited in a predetermined amount so as to cover the opening of the mask. This is followed by pressing in the thickness direction at a pressure of 2 MPa using a single action press, thereby to form a solid electrolyte layer 3. The solid electrolyte layer 3 was formed so as to cover the top and side surfaces of the positive electrode active material layer 2b and the top and side surfaces of the insulating layer 4a on the inner side. The amount of the solid electrolyte layer 3 per unit area was 10.0 mg/cm².

(c) Fabrication of Negative Electrode 1

A negative electrode active material, and $Li_2S$—$P_2S_5$ solid solution (average particle diameter $D_{50}$ (d1): 3.6 μm) serving as a lithium ion-conductive solid electrolyte were mixed at a mass ratio of 6:4, to give a mixture. The negative electrode active material used here was coated particles comprising natural graphite particles (average particle diameter $D_{50}$: 11.21 μm) and an amorphous carbon coating of 10 nm thick.

With a mask having an opening of 50 mm long and 50 mm wide, the opening configured to expose the center portion of the solid electrolyte layer 3 therefrom, placed over the solid electrolyte layer 3, the mixture was deposited by a dry process employing an electrostatic screen method in a similar manner to that of forming the positive electrode active material layer. This is followed by pressing in the thickness direction at a pressure of 2 MPa using a single action press, thereby to form a negative electrode active material layer 1b. The amount of the negative electrode active material layer 1b per unit area was 19.2 mg/cm².

On the negative electrode active material layer 1b, a copper foil of 70 mm long, 70 mm wide, and 18 μm thick was laminated as a negative electrode current collector 1a. An annular electrically-insulating layer 4b was disposed on one side of the negative electrode current collector 1a at its periphery, so as to face the insulating layer 4a. The opening of the insulating layer 4b was square with a size of 55 mm×55 mm. Then, with the insulating layer 4a and the insulating layer 4b attached to each other, the whole was pressed in the thickness direction of each layer at 11.6 kN for 3 sec under reduced pressure, thereby to form an electrode group.

(d) Assembly of Battery

The electrode group obtained in (c) above was inserted into a battery case made of an aluminum laminate film provided with a negative electrode tab and a positive electrode tab for extracting power. While evacuating the gas from the battery case with a vacuum pump, the battery case was thermally fused and sealed. At this time, the positive electrode tab and the negative electrode tab were electrically connected to the positive electrode current collector 2a and the negative electrode current collector 1a, respectively. Thereafter, a pressure of 1000 MPa was applied to the electrode group together with the battery case, in the thickness direction of the electrode group, to complete an all-solid-state battery (monopolar cell). The thickness of the solid electrolyte layer was measured in the aforementioned procedures, which was approximately 100 µm. Likewise, three all-solid-state batteries were fabricated in total.

(2) Evaluation (a) Warpage of all-Solid-State Battery

The all-solid-state batteries were visually checked for warpage, and evaluated by the following criteria.

Good: The all-solid-state battery surface had no waves, and no warpage was observed. When placed on a flat table, there was no part floating 1 mm or more above the table.

Fair: The all-solid-state battery surface had waves, and warpage was observed. When placed on a flat table, there was a part floating 1 mm or more and 5 mm or less above the table.

Poor: The all-solid-state battery surface had large waves, and warpage was observed. When placed on a flat table, there was a part floating more than 5 mm or more above the table.

(b) Open Circuit Voltage

The open circuit voltage of the all-solid-state battery after pressed was determined by measuring a voltage across the battery terminals using a tester, and evaluated by the following criteria.

Good: In all of the all-solid-state batteries, the opening circuit voltage was 0.75 V or more.

Fair: In two out of three all-solid-state batteries, the open circuit voltage was 0.75 V or more.

Poor: In one or zero out of three all-solid-state batteries, the open circuit voltage was 0.75 V or more.

(c) Charge and Discharge Test

While being applied with a pressure of 0.6 t/cm$^2$ (≈589 MPa) in the thickness direction of the electrode group, the all-solid-state battery was constant-current charged at a current of 5 mA to an end-of-charge voltage of 4 V, and then constant-current discharged at a current of 5 mA to an end-of-discharge voltage of 2.7 V. The charge and discharge curves were evaluated by the following criteria.

Good: In all of the all-solid-state batteries, a capacity of 90% or more of the design capacity was obtained.

Fair: In two out of three all-solid-state batteries, a capacity of 90% or more of the design capacity was obtained.

Poor: In one or zero out of three all-solid-state batteries, a capacity of 90% or more of the design capacity was obtained.

(d) Measurement of Average Particle Diameters D1 and D2

On an electron microscope photograph of a cross section of the electrode group of the all-solid-state battery, the average particle diameter D1 of the first solid electrolyte particles in the positive electrode and the negative electrode, and the average particle diameter D2 of the second solid electrolyte particles in the solid electrolyte layer were determined, according to the aforementioned procedures.

In Example 1, D1 and D2 were respectively almost equal to the average particle diameters d1 and d2 of the first solid electrolyte particles and the second solid electrolyte particles used here.

(e) Packing Density

The packing density in the solid electrolyte layer was determined according to the aforementioned procedures. The packing density in the solid electrolyte layer was 99%.

Example 2

A first group of particles having an average particle diameter $D_{50}$ (d21) of 10.20 µm and a second group of particles having an average particle diameter $D_{50}$ (d22) of 5 nm or more and 10 nm or less were mixed at a volume ratio of 90:10, to form a mixture. The solid electrolyte layer 3 was formed using the mixture. All-solid-state batteries were fabricated and evaluated in the same manner as in Example 1, except the above. For the solid electrolyte particles constituting the first group of particles, sulfide-series solid electrolyte containing Li and P (ion conductivity: $2.2 \times 10^{-3}$ S/cm) particles were used. For the solid electrolyte particles constituting the second group of particles, sulfide-series solid electrolyte containing Li and P (ion conductivity: $3.8 \times 10^{-4}$ S/cm) particles were used.

In Example 2, D1 and D2 were respectively almost equal to the average particle diameters d1 and d2 of the first solid electrolyte particles and the second solid electrolyte particles used here. The average particle diameters D21 and D22 of the first group of particles and the second group of particles were respectively almost equal to the average particle diameters d21 and d22 of the first group of particles and the second group of particles used here.

Comparative Example 1

The solid electrolyte layer 3 was formed using $Li_2S$—$P_2S_5$ solid solution (average particle diameter $D_{50}$ (d2): 3.6 µm, ion conductivity: $3.0 \times 10^{-3}$ S/cm) as the second solid electrolyte particles. All-solid-state batteries were fabricated and evaluated in the same manner as in Example 1, except the above.

In Comparative Example 1, D1 and D2 were respectively almost equal to the average particle diameters d1 and d2 of the first solid electrolyte particles and the second solid electrolyte particles used here.

The results of Examples 1 and 2 and Comparative Example 1 are shown in Table 1. Examples 1 and 2 are denoted as A1 and A2, respectively, and Comparative Example 1 is denoted as B1.

TABLE 1

|    | Solid electrolyte layer condition | Open circuit voltage | Charge and discharge test |
|----|-----------------------------------|----------------------|---------------------------|
| A1 | Good                              | Good                 | Fair                      |
| A2 | Good                              | Good                 | Good                      |
| B1 | Fair                              | Fair                 | Poor                      |

In Comparative Example 1, the formation accuracy of the solid electrolyte layer was low; the solid electrolyte layer had large surface waves and unevenness in film thickness, and warpage were observed. Also, in Comparative Example 1, the open circuit voltage was low, and the result of the charge and discharge test was poor. One possible reason therefor is that the packability of the solid electrolyte particles in the solid electrolyte layer was low, failing to achieve a sufficient ion conductivity. Another possible reason is that due to the low formation accuracy of the solid electrolyte layer, the likelihood of internal short circuit increased.

In contrast, in Examples, the formation accuracy of the solid electrolyte layer was high, and no warpage was observed. Also, in Examples, the occurrence of internal short circuit in the all-solid-state batteries was suppressed, leading to good results in both the open circuit voltage and the charge and discharge test. In Examples, solid electrolyte particles used in the solid electrolyte layer had a large average particle diameter, as compared to those used in the positive electrode and the negative electrode. Probably because of this, the flowability of the solid electrolyte particles was enhanced, and the formability of the solid electrolyte layer was improved, which led to enhanced ion conductivity and improved formation accuracy. In Example 2, the first group of particles were used in combination with the second group of particles having a small particle diameter. Probably because of this, the flowability of the solid electrolyte particles was further increased, and high formability of the solid electrolyte layer was secured.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The all-solid-state battery according to the present invention can have an increased energy density, and is therefore useful for various applications requiring high energy density.

REFERENCE SIGNS LIST

1: negative electrode, 2: positive electrode, 1a: negative electrode current collector, 1b: negative electrode active material layer; 2a: positive electrode current collector, 2b: positive electrode active material layer, 3: solid electrolyte layer, 4a, 4b: insulating layer; 5: screen; 6: powder material; 7: power source; 8: rubbing member, 9: electrode, 9a: active material layer, 9b: current collector, 11: negative electrode active material particles, 12: first solid electrolyte particles, 13: positive electrode active material particles, 14: second solid electrolyte particles, 14a: solid electrolyte particles of first group, 15: solid electrolyte particles of second group.

The invention claimed is:

1. An all-solid-state battery, comprising
a positive electrode, a negative electrode, and a solid electrolyte layer interposed between the positive electrode and the negative electrode,
wherein the positive electrode contains first solid electrolyte particles and the negative electrode contains first solid electrolyte particles,
wherein the solid electrolyte layer contains second solid electrolyte particles having ion conductivity,
wherein the first solid electrolyte particles contained in the positive electrode include at least one selected from the group consisting of a sulfide and a hydride,
wherein the first solid electrolyte particles contained in the negative electrode include at least one selected from the group consisting of a sulfide and a hydride,
wherein the second solid electrolyte particles contained in the solid electrolyte layer include at least one selected from the group consisting of a sulfide and a hydride,
wherein an average particle diameter D1 of the first solid electrolyte particles, and an average particle diameter D2 of the second solid electrolyte particles satisfy D2>D1,
wherein the average particle diameter D2 of the second solid electrolyte particles is 3 µm or more,
wherein the second solid electrolyte particles include a first group of particles and a second group of particles, and
wherein the second group of particles of the second solid electrolyte particles each have an average particle diameter D22 of 1 nm or more and less than 100 nm.

2. The all-solid-state battery of claim 1, wherein the solid electrolyte layer has a thickness of 5 µm or more and 150 µm or less, the thickness being smaller than a thickness of the positive electrode and a thickness of the negative electrode.

3. The all-solid-state battery of claim 1, wherein the average particle diameter D2 of the second solid electrolyte particles is 50 µm or less, and equal to or less than a half of the thickness of the solid electrolyte layer.

4. The all-solid-state battery of claim 1, wherein the average particle diameter D1 of the first solid electrolyte particles is 0.01 µm or more and 10 µm or less.

5. The all-solid-state battery of claim 1, wherein the first group of particles of the second solid electrolyte particles each have a particle diameter of 1 µm or more,
wherein the second group of particles of the second solid electrolyte particles each have a diameter of less than 1 µm, and
wherein an average particle diameter D21 of the first group of particles of the second solid electrolyte particles, the average particle diameter D22 of the second group of particles of the second solid electrolyte particles, and the average particle diameter D1 of the first solid electrolyte particles satisfy D21>D1>D22.

6. The all-solid-state battery of claim 5, wherein the first group of particles of the second solid electrolyte particles are contained in the solid electrolyte layer at a ratio of 50 volume % or more.

7. The all-solid-state battery of claim 1, wherein the solid electrolyte layer has a packing density of 99 volume % or more.

8. A production method of an all-solid-state battery, the method comprising:
a step of forming an electrode group that includes a positive electrode, a negative electrode, and a solid electrolyte layer interposed between the positive electrode and the negative electrode; and
a pressing step of pressing the electrode group,
wherein at least one of the positive electrode and the negative electrode contains first solid electrolyte particles,
wherein in the step of forming the electrode group, the solid electrolyte layer is formed by using second solid electrolyte particles having ion conductivity by a dry process,
wherein an average particle diameter d1 of the first solid electrolyte particles used for the electrode, and an average particle diameter d2 of the second solid electrolyte particles used for the solid electrolyte layer satisfy d2>d1, wherein the average particle diameter d2 of the second solid electrolyte particles is 3 μm or more, wherein the second solid electrolyte particles include a first group of particles and a second group of particles, and wherein the second group of particles of the second solid electrolyte particles each have an average particle diameter D22 of 1 nm or more and less than 100 nm.

9. The method of claim 8, wherein, in the pressing step, the electrode group is pressed at a pressure of 100 MPa or more and 1500 MPa or less.

10. The method of claim 8, wherein the solid electrolyte layer is formed without using a binder.

11. An all-solid-state battery, comprising
a positive electrode, a negative electrode, and a solid electrolyte layer interposed between the positive electrode and the negative electrode, wherein at least one of the positive electrode and the negative electrode contains first solid electrolyte particles, wherein the solid electrolyte layer contains second solid electrolyte particles having ion conductivity, wherein an average particle diameter D1 of the first solid electrolyte particles, and an average particle diameter D2 of the second solid electrolyte particles satisfy D2>D1, wherein the average particle diameter D2 of the second solid electrolyte particles is 3 μm or more, wherein the second solid electrolyte particles include a first group of particles each having a particle diameter of 1 μm or more, and a second group of particles each having a diameter of less than 1 μm, wherein an average particle diameter D21 of the first group of particles of the second solid electrolyte particles, an average particle diameter D22 of the second group of particles of the second solid electrolyte particles, and the average particle diameter D1 of the first solid electrolyte particles satisfy D21>D1>D22, and wherein the average particle diameter D22 of the second group of particles of the second solid electrolyte particles is 1 nm or more and less than 100 nm.

12. The all-solid-state battery of claim 11, wherein the average particle diameter D21 of the first group of particles of the second solid electrolyte particles is 5 μm or more and 20 μm or less.

13. The all-solid-state battery of claim 11, wherein the solid electrolyte layer has a thickness of 5 μm or more and 150 μm or less, the thickness being smaller than a thickness of the positive electrode and a thickness of the negative electrode.

14. The all-solid-state battery of claim 11, wherein the average particle diameter D2 of the second solid electrolyte particles is 50 μm or less, and equal to or less than a half of the thickness of the solid electrolyte layer.

15. The all-solid-state battery of claim 11, wherein the average particle diameter D1 of the first solid electrolyte particles is 0.01 μm or more and 10 μm or less.

16. The all-solid-state battery of claim 11, wherein the first group of particles are contained in the solid electrolyte layer at a ratio of 50 volume % or more.

17. The all-solid-state battery of claim 11, wherein the solid electrolyte layer has a packing density of 99 volume % or more.

18. The all-solid-state battery of claim 11, wherein the solid electrolyte layer contains no residue of an organic binder or contains a residue of an organic binder, and
wherein the amount of the residue of the organic binder in the solid electrolyte layer is 1 mass % or less, when the solid electrolyte layer contains the residue of the organic binder.

* * * * *